Patented June 30, 1931

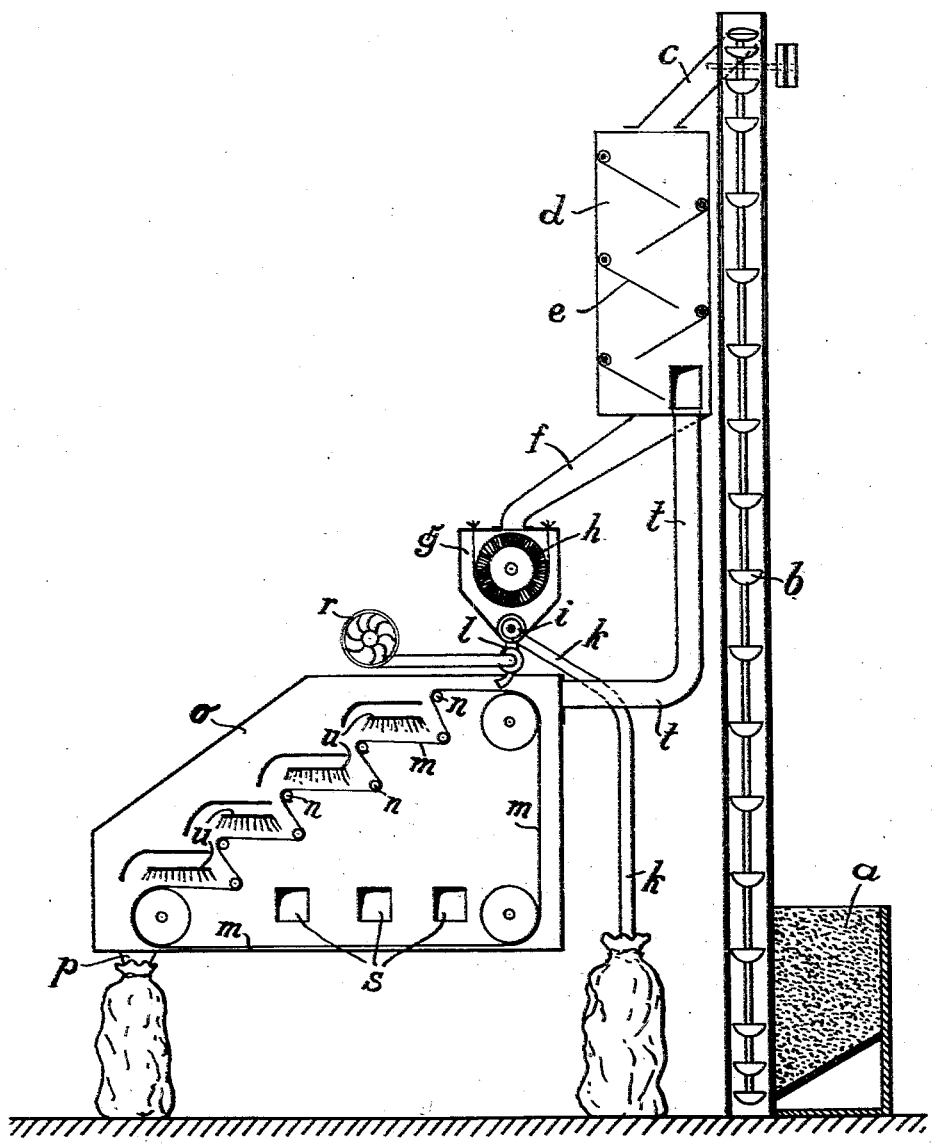

1,811,869

UNITED STATES PATENT OFFICE

EDMUND VON HORVATH AND PETER VIELWERTH, OF MUNICH, GERMANY

METHOD FOR REMOVING THE MOLDY SMELL AND TASTE OF TAINTED CEREALS AND THE LIKE

Application filed January 20, 1928, Serial No. 248,075, and in Germany January 20, 1927.

The moldy smell and taste of tainted cereals, legumes and the like is always due to their over normal degree of moistness in the interior which favors the growth of the bacteria and oidia and results from various reasons, for example moist gathering in, bad storing, transporting over sea and the like.

It has been proposed, to limit the growth of these microorganisms by simply washing and drying the moldy cereals. This method has however proved to be absolutely ineffective as the microorganisms are neither removed nor killed, this method requiring besides much time so that it is expensive and uneconomical. It has further been proposed to remove the moldy smell and taste from tainted cereals by rapid heating up to 100° C. and subsequent rapid cooling. Such methods, based on sterilization, have however also proved ineffective and cause, for instance in grain owing to the withdrawing of a considerable quantity of water, an alteration of the biologic character of the grain, as they make the starch and flour-particles pasty so that flour made from the grain does not possess sufficient baking capability.

Also the method has proved to be ineffective, according to which tainted grain is treated by purely chemical process with freshly glowed calcium or magnesium oxide with addition of a bicarbonate, as the moldy taste and smell returns always.

It has become known, to expose the tainted grain and the like to the action of ultra-violet-rays and to treat the same with heated charcoal, lime and the like, but also then the moldy smell and taste is removed only temporarily and for a very short time, as the heating with charcoal is quite ineffective and consequently quite unnecessary and the lighting with ultra-violet-rays has only an effect lasting a very short time.

This invention relates to a method by means of which tainted materials, as grain, legumes, maize and other granular food and fodder, coffee, chestnuts and the like, can be permanently freed of moldy smell or taste.

The method, according to the invention, consists in moistening more or less the material to be treated in accordance with its property, in drying the same uniformly at a temperature up to 55° C. until the excessive percentage of water has been reduced to the natural percentage, whereupon the material is mechanically cleaned externally, then submitted to flushing with air and finally exposed, under continual turning over, with ultra-violet-light-rays, for the utmost, five minutes. The drying of the material can be carried out by means of special heating means, or to simplify the installation the drying and lighting may be combined. With this object in view the material must be submitted during the lighting to the action of a strong air-current which, according to the strength of the excess of moistness in the material, is cold or warm.

An apparatus for carrying out the method is illustrated, by way of example, in the only figure in the accompanying drawing.

The material to be treated is elevated from a reservoir $a$ by means of an elevator $b$ and poured through a chute $c$ into a drying chamber $d$ which, by suitable means, is heated uniformly up to 55° C. The heating is preferably done by means of hot air. In the drying chamber $d$ hurdles $e$, plates, agitated sieves or the like are arranged which are adjustable so that the passing of the material can be accelerated or retarded in accordance with the percentage of water in the material. A chute $f$ from the bottom of the drying chamber $d$ ends in a chamber $g$, in which a rotating cylindrical brush $h$ is located. Under this brush $h$ a conveyor-screw $i$ is arranged continued by a downwardly directed discharge-pipe $k$. Under the conveyor screw $i$ a distributor $l$ is arranged and under the same an endless conveyor-band $m$ guided in steps over rollers $n$. Any number of steps may be arranged. Over the steps of the conveying band mercury-lamps $u$ are arranged. The conveying band $m$ and the mercury-lamps $u$ are enclosed in a casing $o$ which has in its front-end a discharge-pipe $p$ for the finished material. A blower $r$ for air is arranged in proximity to the distributor $l$. In the casing $o$ several air-inlets $s$ for fresh air are arranged a short distance above the bottom-plate. A pipe $p$ connects the upper end of the casing $o$ with the drying chamber so that the hot air from the casing $o$ is made to flow through this drying chamber.

The operation of the apparatus is as follows:

The material to be freed of the moldy smell or taste is slightly moistened according to the degree of tainting, so that each grain is only quite slightly moistened or, when the material is strongly soiled, washed, and liberated in a centrifuge from the principal amount of water.

At the starting of the elevator $b$ the material to be treated is lifted into the drying chamber $d$ the hurdles $e$ of which are adjusted so that the tainted grain and the like traverses the whole drying chamber in that time which is necessary to reduce the excessive percentage of water in the material to the natural percentage. The travelling speed required for this purpose can be accurately calculated for any kind of material according to the nature and the degree of moistness of the same. The drying is carried out accurately in such a manner that not too much and not too little water is removed from the material, the percentage of water being examined during the drying with the aid of the commonly used instruments (rapid ascertaining of the water percentage). Only hereby the primary condition for the success of the method is given, as by excessive removing of water the highly molecular colloids of the material are denaturized and consequently altered as regards their biologic effect. Insufficient withdrawing of water prevents the destruction of the germs and oidia. The uniform heating of the material up to 55° C., in connection with the reducing of the excessive percentage of the water to the normal percentage leaves the biologic character of the tainted cereals and the like absolutely unaltered.

The material which has thus been treated is then cleaned mechanically on the outer surface by means of the brush $h$, so that dirt, dust and other foreign bodies are removed. They drop onto the conveyer screw $i$, which conveys the same into the pipe $k$ and thence into a collecting vessel. The thoroughly cleaned material is exposed to the action of an air current, so that the foreign bodies which may still adhere will disappear. From the distributor $l$ the perfectly cleaned material gets onto the conveyer band $m$ on which it descends stepwise in cascades so that the individual grains of the material are continually turned over and stirred so that each grain is exposed on all sides to the action of the mercury vapour lamps $u$. By this thorough mechanical cleaning of the material the active ultra violet rays can penetrate into the material to the required depth, whereby the microorganisms producing the decay are killed or rendered harmless. The mercury vapour lamps are arranged at a distance of about 20 cm from the material to be lighted, this distance having been found to be the most effective. The time of lighting depends on the kind of the material and amounts at least to ½ minute up to the maximum duration of 5 minutes. By accordingly rapid movement of the conveyer band the material can be moved in the desired time along the lighting lamps, each grain being exposed on all sides to the action of the light rays owing to its whirling movement.

As already mentioned the installation for carrying out the process can be simplified by combining the drying up to 55° C. and the lighting of the material in such a manner that the quartz lamps effect the drying. In this case the elevator and the drying chamber are not necessary, so that only one single receptacle is required containing the quartz lamps, the agitating mechanism for turning over the material, and a blower blowing hot or cold dry air in counter current over the material to be lighted.

We claim:

1. The process of reconditioning tainted cereals, legumes and the like which comprises exposing the moist material to a drying temperature not exceeding approximately 55° C. until the excess moisture therein has been removed and its normal water content substantially restored, and effectually subjecting the material to the action of ultra-violet rays for a period not substantially exceeding five minutes.

2. The process of treating tainted cereals, legumes and the like, to permanently remove the musty odor and taste thereof, which comprises subjecting the moist material to a substantially uniform drying temperature not exceeding approximately 55° C. for a period of time sufficient to restore its water content substantially to normal, cleaning the surface of the material, and effectually treating the material with ultra-violet rays for a period not substantially exceeding five minutes.

3. The process of reconditioning cereals, legumes and the like, which comprises simultaneously drying, cleaning and treating the moistened material by passing the same past quartz lamps while exposed to a counter-current of air, the feed of the material, the design and arrangement of the lamps, and the strength and temperature of the air current being so adjusted that the excess moisture will be removed and the normal water content of the material approximately restored at a temperature not subsantially exceeding 55° C. and the material will be exposed to the action of the ultra-violet rays of the lamps for a period not substantially exceeding five minutes.

4. The process of reconditioning tainted cereals, legumes, and the like which comprises continuously and uniformly drying the tainted material at a drying temperature which will not heat it above approximately 55° C. until the excess moisture therein has been removed and its normal water content substantially restored, and effectually subjecting the material to the action of ultra-violet rays for a period not exceeding five minutes.

5. The process of reconditioning tainted cereals, legumes and the like which comprises simultaneously drying and treating with ultra-violet rays of light the tainted material by causing it to pass a series of quartz lamps in opposition to a counter-current of dry air in manner to effectually expose all its grains to the action of the ultra-violet rays of light from the lamps and to remove the excess moisture therein and restore its normal water content without subjecting it to a temperature substantially above 55° C.

In testimony whereof we affix our signatures.

Dr. EDMUND v. HORVATH.
Dr. PETER VIELWERTH.